United States Patent [19]

Smith

[11] Patent Number: 5,181,234
[45] Date of Patent: Jan. 19, 1993

[54] X-RAY BACKSCATTER DETECTION SYSTEM

[75] Inventor: Steven W. Smith, Poway, Calif.
[73] Assignee: IRT Corporation, San Diego, Calif.
[21] Appl. No.: 704,292
[22] Filed: May 22, 1991

Related U.S. Application Data

[63] Continuation-in-part of Ser. No. 563,041, Aug. 6, 1990, abandoned.

[51] Int. Cl.$^5$ .......................... G01N 23/04; G06K 9/46
[52] U.S. Cl. .......................................... 378/87; 378/57; 378/62; 378/70; 378/146; 378/901; 382/16; 382/22; 250/472.1
[58] Field of Search ...................... 378/87, 62, 57, 70, 378/86, 88, 146, 901, 99; 250/472.1; 382/16, 22

[56] References Cited

U.S. PATENT DOCUMENTS

| | | | |
|---|---|---|---|
| Re. 28,544 | 9/1975 | Stein et al. | 378/57 |
| 4,799,247 | 1/1989 | Annis et al. | 378/87 |
| 4,864,142 | 9/1989 | Gomberg | 378/57 |
| 4,974,247 | 11/1990 | Friddell | 378/87 |
| 5,022,062 | 6/1991 | Annis | 378/86 |

Primary Examiner—Constantine Hannaher
Assistant Examiner—Kim-Kwok Chu
Attorney, Agent, or Firm—Brown, Martin Haller & McClain

[57] ABSTRACT

A pencil beam of X-rays is scanned over the surface of the body of a person being examined. X-rays that are scattered or reflected from the subject's body are detected by a detector. The signal produced by this scattered X-ray detector in then used to modulate an image display device to produce an image of the subject and any concealed objects carried by the subject. The detector assembly is constructed in a configuration to automatically and uniformly enhance the image edges of low atomic number (low Z) concealed objects to facilitate their detection. A storage means is provided by which previously acquired images can be compared with the present image for analyzing variances in similarities with the present image, and provides means for creating a generic representation of the body being examined while suppressing anatomical features of the subject to minimize invasion of the subject's privacy.

42 Claims, 6 Drawing Sheets

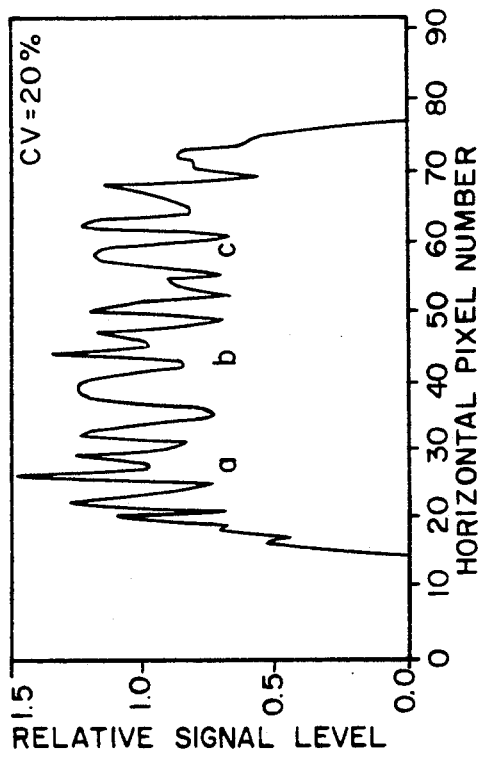
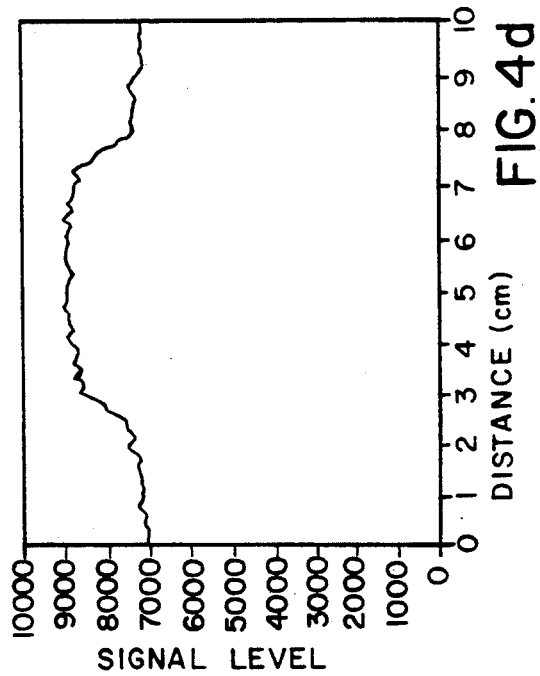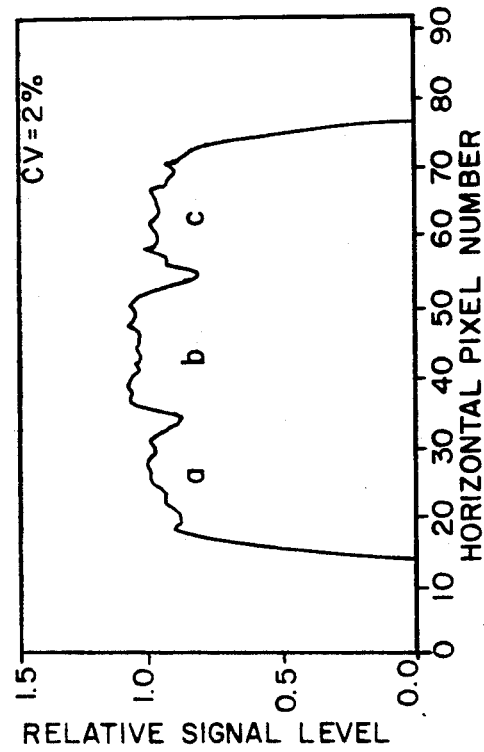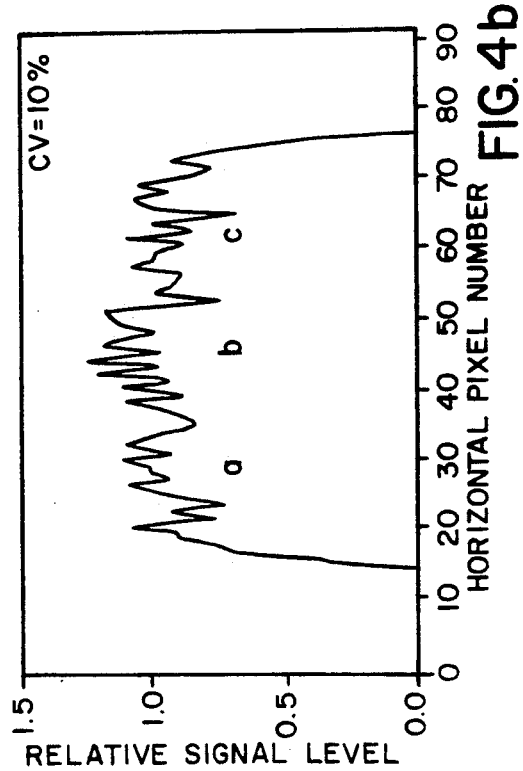

FIG. 10a — VERTICAL EDGE

|     | n−1 | n−2 | n | n+1 | n+2 |
|-----|-----|-----|---|-----|-----|
| M−2 | −1  | −1  | 0 | 1   | 1   |
| M−1 | −1  | −1  | 0 | 1   | 1   |
| M   | −1  | −1  | 0 | 1   | 1   |
| M+1 | −1  | −1  | 0 | 1   | 1   |
| M+2 | −1  | −1  | 0 | 1   | 1   |

FIG. 10b — HORIZONTAL EDGE

|     | n−1 | n−2 | n  | n+1 | n+2 |
|-----|-----|-----|----|-----|-----|
| M−2 | 1   | 1   | 1  | 1   | 1   |
| M−1 | 1   | 1   | 1  | 1   | 1   |
| M   | 0   | 0   | 0  | 0   | 0   |
| M+1 | −1  | −1  | −1 | −1  | −1  |
| M+2 | −1  | −1  | −1 | −1  | −1  |

FIG. 10c — DIAGONAL EDGE

|     | n−2 | n−1 | n  | n+1 | n+2 |
|-----|-----|-----|----|-----|-----|
| M−2 | −1  | −1  | −1 | −1  | 0   |
| M−1 | −1  | −1  | −1 | 0   | 1   |
| M   | −1  | −1  | 0  | 1   | 1   |
| M+1 | −1  | 0   | 1  | 1   | 1   |
| M+2 | 0   | 1   | 1  | 1   | 1   |

FIG. 10d — VERTICAL ROD

|     | n−2 | n−1 | n | n+1 | n+2 |
|-----|-----|-----|---|-----|-----|
| M−2 | −1  | 0   | 2 | 0   | −1  |
| M−1 | −1  | 0   | 2 | 0   | −1  |
| M   | −1  | 0   | 2 | 0   | −1  |
| M+1 | −1  | 0   | 2 | 0   | −1  |
| M+2 | −1  | 0   | 2 | 0   | −1  |

FIG. 10e — HORIZONTAL ROD

|     | n−2 | n−1 | n  | n+1 | n+2 |
|-----|-----|-----|----|-----|-----|
| M−2 | −1  | −1  | −1 | −1  | −1  |
| M−1 | 0   | 0   | 0  | 0   | 0   |
| M   | 2   | 2   | 2  | 2   | 2   |
| M+1 | 0   | 0   | 0  | 0   | 0   |
| M+2 | −1  | −1  | −1 | −1  | −1  |

FIG. 10f — DIAGONAL ROD

|     | n−2 | n−1 | n  | n+1 | n+2 |
|-----|-----|-----|----|-----|-----|
| M−2 | −1  | −1  | −1 | 0   | 2   |
| M−1 | −1  | 0   | 0  | 2   | 0   |
| M   | −1  | 0   | 2  | 0   | −1  |
| M+1 | 0   | 2   | 0  | 0   | −1  |
| M+2 | 2   | 0   | −1 | −1  | −1  |

X-RAY BACKSCATTER DETECTION SYSTEM

This application is a continuation-in-part of co-pending application Ser. No. 07/563,041, filed Aug. 6, 1990, now abandoned.

FIELD OF THE INVENTION

The invention relates to the general field of radiant energy imaging systems, and specifically to systems and techniques for detecting concealed objects, including plastics and ceramics, carried on the body of a person.

BACKGROUND OF THE INVENTION

Security systems are presently limited in their ability to detect contraband, weapons, explosives, and other dangerous objects concealed under clothing. Metal detectors and chemical sniffers are commonly used for the detection of large metal objects and some kinds of explosives, however, a wide range of dangerous objects exist that cannot be detected with these devices. Plastic and ceramic weapons developed by modern technology increase the types of non-metallic objects that security personnel are required to detect. The alternative of manual searching of subjects is slow, inconvenient, and would not be well tolerated by the general public, especially as a standard procedure in, for example, airports.

Known prior art X-ray systems suggested for detecting objects concealed on persons have limitations in their design and method which prohibit them from achieving the low dose and high image quality which are prerequisites of commercial acceptance.

Radiation exposure is an important consideration in X-ray concealed object detection systems. The United States National Council on Radiation Protection (NCRP), in NCRP Report No. 91, "Recommendations on Limits for Exposure to Ionizing Radiation", 1987, addresses this issue. In this report, the NCRP states that a radiation exposure of less than 1000 microRem per year in excess of environmental levels is negligible, and efforts are not warranted at reducing the level further. Persons employed in security facilities or frequently traveling by airlines may be subjected to many hundred security examinations per year. A yearly radiation exposure of 1000 microRem permits a single scan exposure within the range of 1 to 10 microRem for the general public. In accordance with the NCRP recommendations, radiation levels significantly higher than this present a non-trivial health risk.

An inspection system which operates at a low level of radiation exposure is limited in its precision by the small number of X-rays that can be directed against a person being searched. X-ray absorption and scattering further reduces the number of X-rays available to form an image of the person and any concealed objects. In prior art systems, this low number of detected X-rays has resulted in unacceptably poor image quality.

Radiant energy imaging systems have been proposed to detect concealed objects. The system disclosed in U.S. Pat. No. Re. 28,544 of Stein et al. projects a scanning pencil beam of X-rays through the subject's body where the beam will be transmitted or absorbed depending upon the concealed object, if any. A detector is scanned vertically behind the subject to collect transmitted X-rays. Stein et al. comment that, "although the detector 25 is shown behind the object being scanned for responding to the radiant energy transmitted through the object being scanned, it is within the principles of the invention to position the detector in the region between the radiant energy source and the object being scanned to respond to the scattered energy." However, the X-ray tube potential is set at up to 150 Kilovolts and is specifically chosen to transmit X-rays through the person being examined. Operation of the X-ray tube at 150 Kilovolts or even at 100 Kilovolts would negate benefits of imaging by backscatter detection, e.g., low dose scanning. This technique requires the subject to be exposed to a substantial radiation dosage, especially if the subject is scanned often, e.g., a frequent flyer.

U.S. Pat. No. 4,839,913 of Annis et al. teaches a flying spot scanning system for baggage inspection which uses X-ray-induced fluorescence to permit detection of concealed objects. Since fluorescence is dependent upon atomic number, each object emits a fluorescent radiation line which is unique to its atomic number Z. Scattered, transmitted and fluorescence signals are generated to distinguish objects from the background. The energy level of the source must be sufficient to excite a selected fluorescence radiation line so that the fluorescent radiation line has sufficient energy to escape the object. Thus, it may be necessary to expose the object to relatively high X-ray energy in order to detect certain materials, which would be unacceptable for personnel inspection systems.

Another baggage inspection system is disclosed (U.S. Pat. No. 4,799,247 of Annis et al.) which has detectors for both transmitted and backscattered X-rays to independently produce signals from the same incident beam. The separate signal may then be used to enhance each other to increase the system's accuracy in recognizing low Z materials. Clearly, with the incident beam being of sufficient energy to provide both transmitted and backscattered signals, the X-ray energy must be relatively high, similar to that of Stein et al., making such a system undesirable for personnel inspection. A similar technique is described by Glockmann et al. (U.S. Pat. No. 4,884,289) for baggage inspection where both transmission and backscatter is used.

Systems of the foregoing prior art that apply to body scanning are designed to detect radiant energy that has been transmitted through the body, scattered from the body, or emitted from the body. In the prior art systems, images are produced by characteristics of the subject's body and any object concealed under the subject's clothing. The system operator then inspects each image for evidence of concealed objects.

For various reasons the prior art systems do not adequately detect plastics, ceramics, explosives, illicit drugs, and other non-metallic objects. One reason in particular is that these materials share the property of a relatively low atomic number (low Z). Low Z materials present a special problem in personnel inspection because of the difficulty in distinguishing the low Z object from the background of the subject's body which also has low Z. Detection of low Z materials is addressed in the Annis '247 patent, but only for baggage. As mentioned above, this technique exposes a live subject to radiation levels which are excessive.

It would be desirable to provide an X-ray inspection system for detecting concealed objects carried by a person which is capable of detecting low Z materials as well as metals, but which does not expose the subject to radiation doses significantly higher than normal environmental radiation levels. It is to such a system that the present invention is directed.

SUMMARY OF THE INVENTION

It is an advantage of the present invention to provide an X-ray personnel detector which is capable of rapid inspection of persons to detect metals as well as low Z materials (plastics, ceramics and illicit drugs) which might be concealed beneath the person's clothing.

It is another advantage of the present invention to provide such rapid inspection at low levels of radiation which are safe even with repeated use.

In an exemplary embodiment, the present invention is a concealed object detection system in which a pencil beam of X-rays is scanned over the surface of the body of a person being examined. X-rays that are scattered or reflected from the subject's body are detected by a detector such as, for example, a scintillator and photomultiplier tube combination. The signal produced by this scattered X-ray detector is then used to modulate an image display device to produce an image of the subject and any concealed objects carried by the subject.

It is known in the art that the scattered X-ray intensity is related to the atomic number of the material scattering the X-rays. In addition, the intensity is related to the atomic number of the material the X-rays pass through before and after being scattered.

In general, for atomic numbers less then 25, the intensity of X-ray backscatter, or X-ray reflectance, decreases with increasing atomic number. The images are primarily modulated by variations in the atomic number of the subject's body. Objects are potentially visible in X-ray reflection images of persons due to the difference in X-ray reflectances between the objects and human tissue. Soft human tissue scatters a significant amount of X-rays due to the relatively low atomic number of oxygen which predominates its composition. Bones near the surface of the body produce much less scatter due to the higher atomic number of calcium which makes up their structure. Concealed objects, especially metals, can be easily visualized in the images due to their significant difference in atomic composition from the background of human tissue.

Non-metallic objects are commonly composed of low atomic number elements similar to human tissue, i.e. hydrogen, carbon, nitrogen, and oxygen. In prior art systems, especially of the transmission type, an operator is required to identify very low contrast objects in the presence of image clutter resulting from the imaging of internal human anatomy. The difficulty of this task results in poor detection capability for a wide range of dangerous objects composed of low atomic number elements, such as plastics or ceramics.

The present invention provides a system and method providing a scattered X-ray imaging system for detecting low atomic number concealed objects. In its preferred embodiment, the system includes apparatus for automatically and uniformly enhancing the image edges of low atomic number concealed objects to facilitate their detection. Edge enhancement is provided while simultaneously suppressing the edges of internal anatomy that produce confusion in image interpretation. Further, the preferred embodiment provides a storage means by which previously acquired images can be compared with the present image for analyzing variances in the present image. The present invention also provides means for creating a non-human representation of the body being examined to thereby permit faster inspection with less invasion of privacy. The present invention improves detection efficiency and decreases the time required to inspect a subject.

One embodiment of the present invention does not require the operator to view an actual image of the subject's body to obtain an indication of objects desired to be detected; a generic body outline or template can be used to indicate relative location of concealed objects. This eases concerns related to a possibly objectionable invasion of privacy.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 4 is a series of graphs showing relative signal level versus scan position;

FIG. 10 shows several example feature detection kernels used in the inventive system;

DETAILED DESCRIPTION OF THE PREFERRED EMBODIMENT

Figure 1:
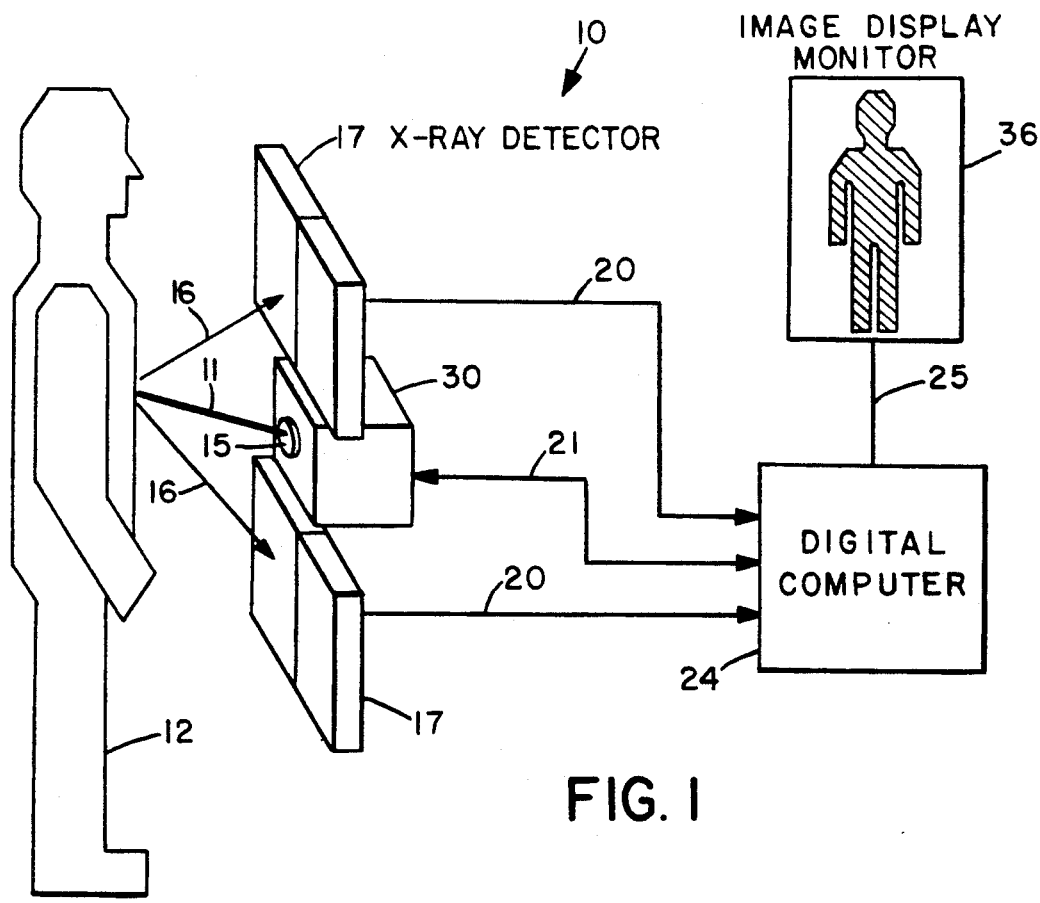
FIG. 1 is a diagrammatic view of the backscatter detection system of the present invention.
Figure 2:
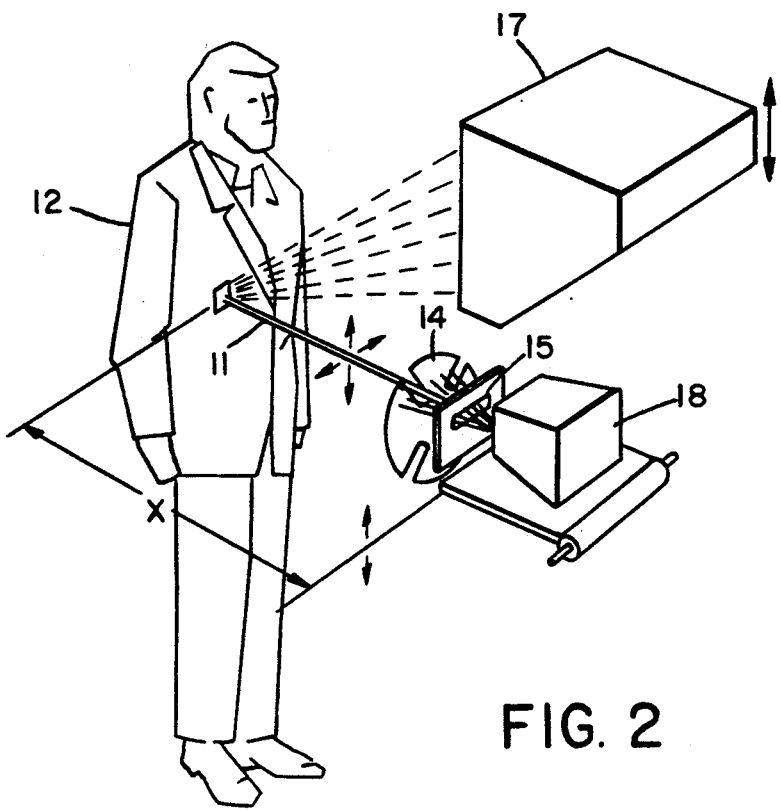
FIG. 2 is a diagrammatic perspective view of the present invention.
Figure 11:
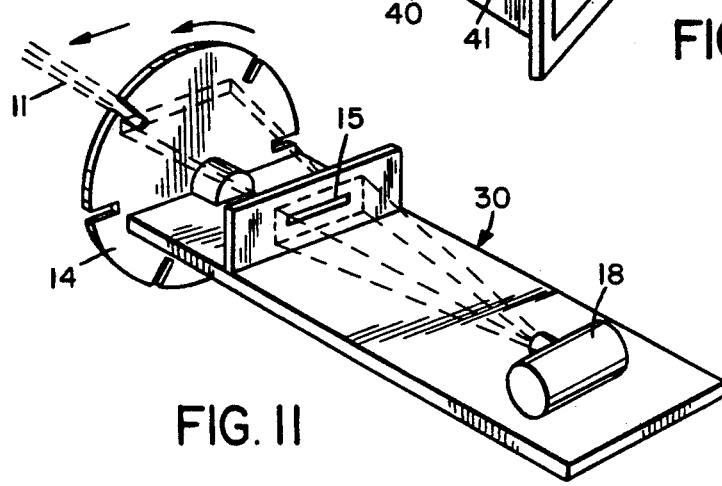
FIG. 11 shows the mechanical means of generating a sweeping pencil beam of X-rays in the preferred embodiment.

As shown in FIGS. 1 and 2, the imaging system 10 provides a pencil beam 11 of X-rays directed at the body 12 of the person being examined. In the preferred embodiment, an X-ray tube 18, a mechanical chopper wheel 14 and slit 15 combine to create an X-ray pencil beam source 30 as is known in the art for scanning the pencil beam 11 in a horizontal motion across the body 12, illustrated in FIG. 11. X-rays 16 that are scattered or reflected from the body 12 are detected by X-ray sensitive detectors 17 positioned on the same side of the subject as is the X-ray pencil beam source 30. The detectors 17 are positioned for substantially uniform X-ray detection on all sides of the incident X-ray beam. The electronic signal 20 produced from the detectors 17 and synchronization signals 21 from the X-ray source 30 are routed into digital computer 24. The computer 24 generates an image display 25 on a monitor (screen) 36 wherein the intensity at each point in the display corresponds to the relative intensity of the detected scattered X-rays.

Figure 5A:
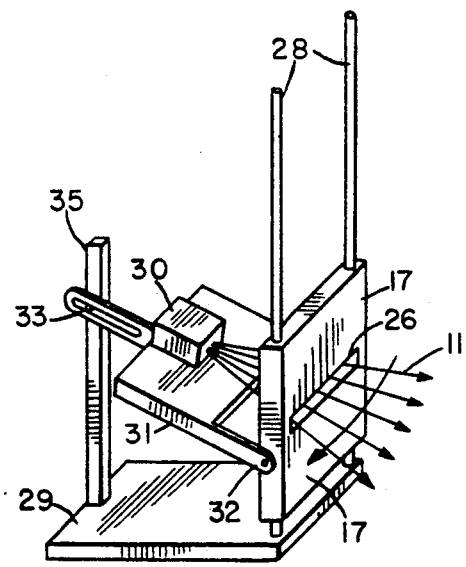
FIG. 5 shows the mechanical features and movement of the inventive system.
Figure 5B:
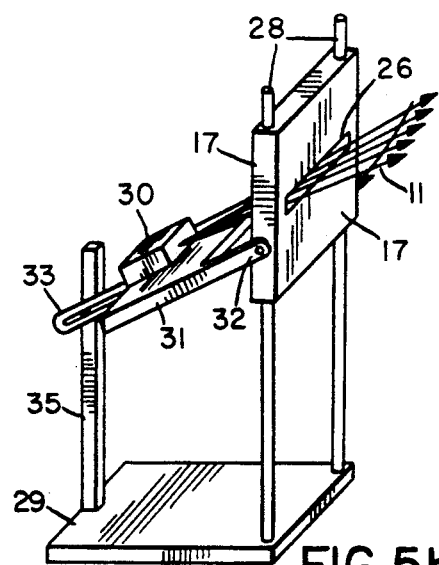

As schematically illustrated in FIG. 5, the detectors 17 contain an opening 26 through which the pencil beam 11 of X-rays pass before striking the body 12 being examined. The detectors 17 are mounted on two vertical shafts 28 which are in turn mounted on a base 29 to guide the motion of the detectors 17 as they are moved in a vertical direction. The X-ray pencil beam source 30 is mounted on a carriage 31, which in turn in supported by two pivot joints 32 and 33; one connected to the detector, and the other to a vertical support 35. As the detectors 17 are moved in a vertical direction, the X-ray pencil beam 11 is moved in an arc, such that it always passes through the opening 26 in the detector.

Figure 12:
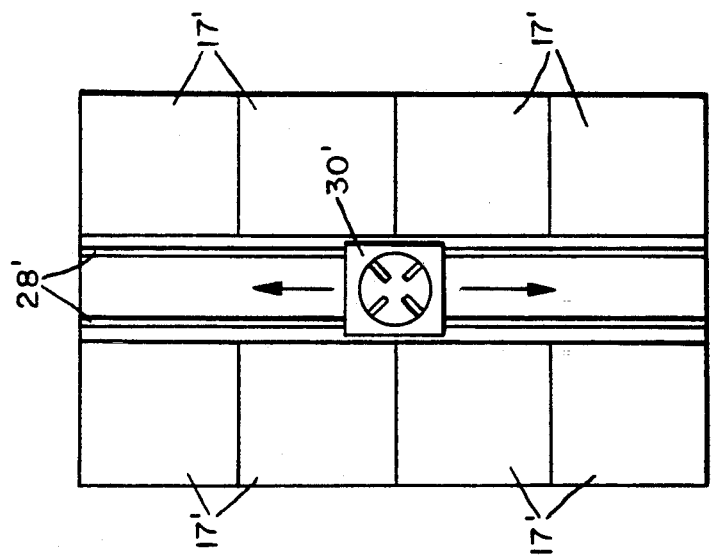
FIG. 12 illustrates a detector configuration of a second embodiment.

An alternate configuration for the detectors is illustrated in FIG. 12. In this embodiment, the need to move the weight of the detectors is eliminated by making the detectors stationary and scanning only the X-ray source in a manner as described above to facilitate a faster scan rate. Eight detectors 17' are positioned in two stacks with the X-ray source 30' and its scanner centered between the stacks. X-ray source 30' travels up and down on vertical shafts 28' with pivot joints provided so the X-ray pencil beam is scanned in an arc. X-rays backscattered from the subject are collected by detectors 17' as the source 30' is scanned.

As shown in FIG. 2, the intersection of the pencil beam and the body of the person defines an image picture element (pixel) of specified area. In the preferred embodiment, the X-ray tube operates in the range of 35 to 70 Kilovolts with a pixel size of 12 to 120 square millimeters. The backscatter X-ray detector 17 comprises an X-ray sensitive area of 150 to 1500 square inches and is positioned 5 to 15 inches from the body of the person being examined. In another embodiment, the backscatter detector may be positioned farther from the person being examined with a corresponding increase in detector area. It has been empirically determined that these parameters are approximately optimized at the values of 50 Kilovolts, 40 square millimeters pixel area, 952 square inches X-ray sensitive area, and an 8 inch subject-to-detector distance. These technique factors simultaneously provide a CV (coefficient of variation, to be defined below) in the range of 2 to 10 percent and X-ray dose in the range of 1 to 5 microRem, as shown by the following analysis of a preferred embodiment of the present invention.

The X-ray beam sweeps in a horizontal motion by means of a mechanical collimator known in the prior art, for example U.S. Pat. No. Re. 28,544 of Annis et al. As the pencil beam sweeps in a horizontal motion across an image area or window, each ¼" by ¼" pixel (40 square millimeters) is illuminated by X-rays for 50 microseconds. During each 50 microsecond illumination of a pixel, the signal 20 provided by X-ray backscatter detector 17 is averaged and converted to provide a single digital number representative of the number of X-rays striking the detector during the pixel illumination period. This may be accomplished by methods known in the art, for example, counting electronic pulses produced by individual X-rays or integrating the detector signal for the period of the 50 microseconds. Each horizontal line is composed of 120 pixels thereby forming an image width of 120×¼ inch=30 inches. Simultaneous with the horizontal scanning motion, a vertical scanning motion occurs which displaces the X-ray beam ¼ inch vertically in the time period required for one complete horizontal line or 120×50 microseconds=6 milliseconds. This allows the next horizontal line to be measured with a vertical and horizontal pixel spacing of ¼ inch by ¼ inch. The total vertical scanning of 320 lines provides an image vertical height of 320×¼ inch=80 inches and a scanning time of 320×6 milliseconds=1.9 seconds. The resulting image acquisition area, or window, of 30 inches by 80 inches is sufficiently large to search most persons. A scanning cycle of the apparatus is defined as the time required to scan the pencil beam of X-rays over each pixel in the image to provide a complete image of the person and objects positioned in the scanning window.

In the preferred embodiment, the X-ray source is composed of an X-ray tube operating at 50 Kilovolts and 5 milliamps, with an inherent filtration equivalent to 1 millimeter aluminum. The X-ray source itself is located approximately 30 inches from the person being examined. Standard references, for example: "Catalogue of Spectral Data for Diagnostic X-rays" by Birch, Marshall and Ardran, Published by The Hospital Physicists' Association, London, 1979.", provide data on X-ray tube output. From this reference, under the conditions created according to the preferred embodiment and the here before stated geometry, the subject receives a radiation dose of approximately three (3) microRem with a corresponding X-ray photon flux of about 11,500 X-rays in each pixel. Each of these 11,500 X-rays per pixel will either (1) pass through the body unaffected, (2) be absorbed in the body by the photoelectric effect, or (3) exit the body by Compton scattering.

Figure 6:
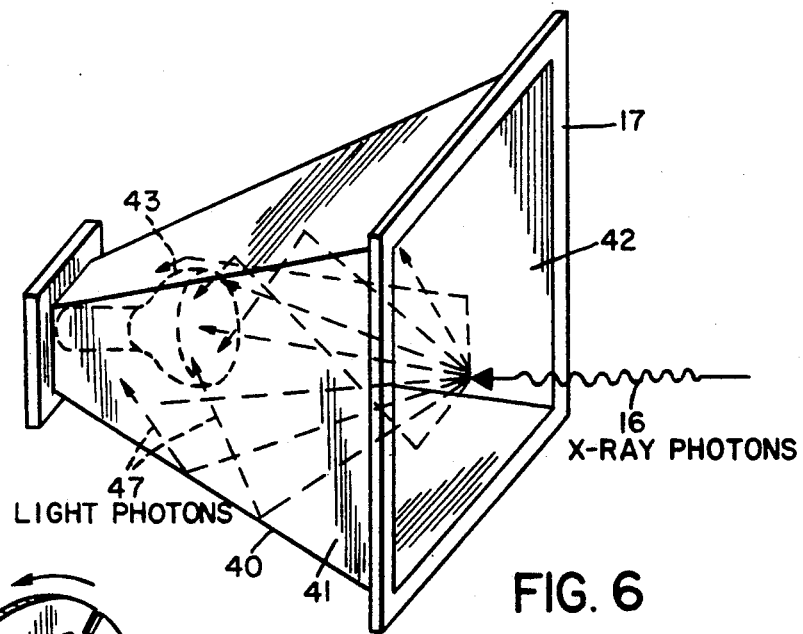
FIG. 6 is a diagrammatic view of a detector used in the system.

As shown in more detail in FIG. 6, each detector 17 is composed of a light tight enclosure 40 having its interior walls 41 arranged to have light reflective surfaces, such as by being painted white. An X-ray intensifying screen 42 forms a front cover or wall of enclosure 40. Screen 42 is of the type used in medical radiography for increasing the exposure rate of X-ray film. A large area photomultiplier tube 43 is mounted at the opposite end of the interior of the enclosure. X-ray photons indicated as 16 strike the X-ray intensifying screen 42 producing light photons 47 in the interior of the light tight enclosure 40. A portion of the light photons 47 reflect off of the white, or otherwise highly reflective, interior walls 41 of the enclosure and are detected by the photomultiplier tube 43. In this manner, the output signal of photomultiplier tube 43 is linearly related to the incident X-ray flux.

As is known in the art, the detected quantum efficiency of each detector 17 is determined by many factors: the fraction of X-rays interacting in the screen 42, the optical pulse-height distribution of light photons leaving the screen, the average number of photoelectrons generated in the photomultiplier tube for each X-ray interacting in the screen, the uniformity of light transfer from the screen 42 to the photomultiplier tube 43, and statistical noise within the photomultiplier tube itself.

To maximize the detected quantum efficiency with these many interacting parameters, the preferred embodiment of the detectors 17 comprise components with the following specifications. The input scintillator or phosphor is a calcium tungstate screen approximately 14×17 inches (35.5×43 cm) in size with an approximate phosphor areal density of 80 milligrams per square centimeter. Four separate detectors 17 with this size of screen are placed around the X-ray pencil beam 11 to form a detector array, as shown in FIG. 1. The outputs of the four detectors 17 are processed in the computer 24 to form a single detector signal.

In the embodiment illustrated in FIG. 12, eight separate detectors 17' are used in the configuration shown.

A five inch diameter bialkali cathode photomultiplier tube 43 is placed about eight inches from the screen 42. This geometry produces an average of approximately seven photoelectrons at the photo cathode for each X-ray striking the center of the screen 42. Each X-ray striking the corner of the screen generates an average of approximately 5 photoelectrons. Moving the photomultiplier tube 43 farther from the screen 42 increases the uniformity of response over the area of the screen. This, however, decreases the average number of photoelectrons generated. The above noise sources combine resulting in an overall detected quantum efficiency of approximately 50%.

Certain changes are possible which optimize one parameter at the expense of another. For example, the screen phosphor of the detectors 17 may be changed to barium lead sulfate to decrease the decay time at the expense of light output and a resulting decrease in detector quantum efficiency.

FIG. 6 shows the face of the photomultiplier tube 43 parallel to the screen to maximize light transfer uniformity, however, other orientations may be provided to change the shape of the detector enclosure.

The present invention detectors 17 are unique in that they provides a much larger active area than the prior art scintillators attached directly to photomultiplier tubes. Construction limitations of photomultiplier tubes limit the active light detection area of these devices. This, in turn, limits the X-ray sensitive area of the prior art systems. Each of the detectors 17 allows for an X-ray sensitive area of many times larger than the light sensitive area of the associated photomultiplier tube 43, while still maintaining a high detector quantum efficiency. A large sensitive area is desirable for greatly improved system performance, providing lower subject radiation dose, lower required X-ray source output, and automatic edge modification for improved object detection.

Several interacting parameters are controllable in the above described concealed object detection system. These include the X-ray tube potential and current, the size of the X-ray pencil beam, and the type of X-ray detector used. The present invention provides a system and method for selectively setting various parameters for providing a rapid and safe method of detecting dangerous concealed objects. Otherwise the system might exhibit unacceptably high subject radiation exposure, excessively long image acquisition times, and poor image quality.

A first parameter to consider is the X-ray tube potential. The average energy of X-rays produced by an X-ray tube is directly related to the potential at which the X-ray tube is operated. The energy of these X-rays, in turn, determines the characteristics of the acquired image.

Figure 7:
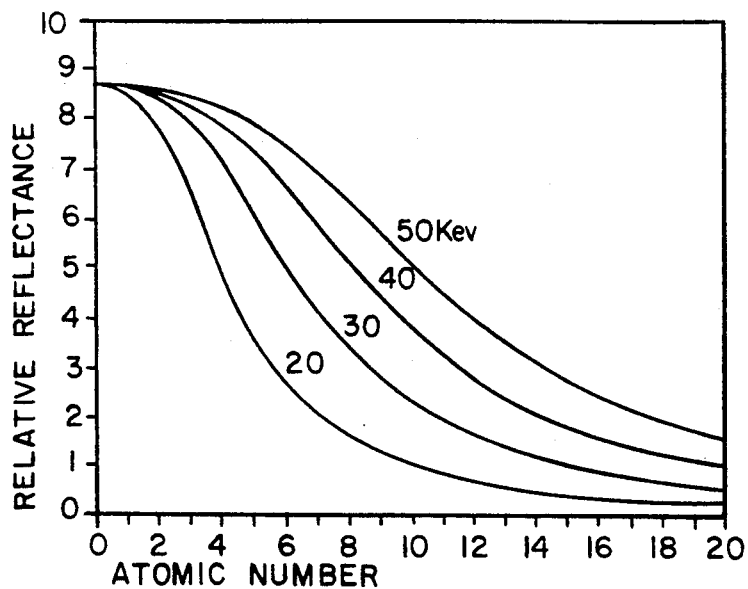
FIG. 7 is a graph of atomic number versus relative reflectance.

FIG. 7 shows the relative X-ray reflectance, as sensed at the detectors 17, as a function of the incident X-ray energy and the atomic number of the material scattering the X-rays. The shape of these curves is known through empirical measurement and computer modeling, for example: "A Signal Processing Model of Diagnostic X-ray Scatter" by Smith and Kruger, Med. Phys. 13(6) Nov. 1986 and "Backscatter X-ray Imaging", by Bossi et, Mat. Eval. 46, Oct. 1988. The shape of these curves is a result of two mechanisms whereby X-rays interact with matter: Compton scattering and the photoelectric effect. An X-ray interacting by Compton scattering is deflected out of the original X-ray beam creating backscattered radiation. The photoelectric effect, in comparison, absorbs X-rays and thus reduces the level of backscatter. At low atomic numbers and high energies, Compton scattering is more likely to occur than the photoelectric effect. This gives rise to a large amount of backscatter and the relatively high reflectance shown in FIG. 7. At higher atomic numbers and lower X-ray energies, the photoelectric effect absorbs more of the X-rays resulting in less backscatter and the low reflectance shown in FIG. 7.

Oxygen is the dominant atom in water and, therefore, in human tissue. One of the most difficult tasks required of the inventive detection system is to discriminate between human tissue and objects of similar atomic number. This includes a wide range of plastics, explosives, and organic matter composed mainly of carbon, nitrogen and oxygen, with atomic numbers of 6, 7 and 8, respectively. The optimum X-ray energy can therefore be defined as the energy that provides the highest signal-to-noise ratio (SNR) for discriminating carbon from oxygen. The SNR as a function of X-ray energy can be derived from FIG. 7. The signal for distinguishing between carbon and oxygen is the difference in reflectance between these two elements. This can also be expressed as the average slope of the reflectance curve between the two elements. In mathematical terms, this is the first derivative of reflectance with respect to atomic number evaluated at the midpoint between the two elements, or atomic number 7:

$$S(E) = \frac{dR(E, Z = 7)}{dE} \qquad (1)$$

where $S(E)$ is the signal for distinguishing carbon from oxygen as a function of energy, and $R(E, Z=7)$ is the X-ray reflectance at atomic number 7, as a function of energy.

The image noise in a well designed X-ray imaging system is determined by Poisson statistics based on the average number of X-rays detected in each image pixel. This results in the coefficient of variation (CV), or the relative image noise, being inversely proportional to the square root of the number of detected X-rays:

$$CV = N^{-\frac{1}{2}} \times 100\% \qquad (2)$$

where CV is the coefficient of variation between pixels and N is the average number of X-rays detected per pixel. This can be most easily calculated for a specific image by, for example, localizing several hundred adjacent image pixels located in an anatomically flat area near the center of the subject's body. The mean and standard deviation are calculated by standard statistical methods. The image CV is then 100% times the standard deviation divided by the mean.

The average number of X-rays detected per pixel is directly proportional to the magnitude of the reflectance shown in FIG. 7. Rewriting equation (2) with this information:

$$CV(E) = k \left( \frac{1}{\sqrt{R(E, Z = 7)}} \right) \qquad (3)$$

where $CV(E)$ is the coefficient of variation as a function of X-ray energy, and k is a constant of proportionality depending on the incident X-ray flux and detector efficiency.

The SNR for distinguishing carbon from oxygen as a function of X-ray energy can be found by dividing S(E) from Equation (1) by CV(E) from Equation (3):

$$SNR(E) = \frac{\sqrt{R(E,Z=7)}}{k} \times \frac{dR(E,Z=7)}{dE} \quad (4)$$

Figure 8:
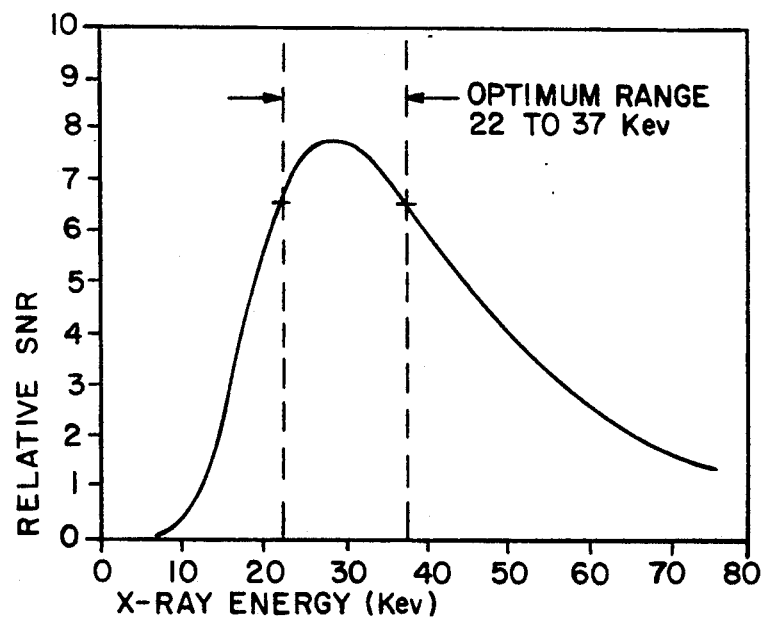
FIG. 8 is a graph of X-ray energy versus relative SNR.

The above function is illustrated in FIG. 8. The SNR can be seen to be very dependent on X-ray energy and is optimized in the range of 22 to 37 Kiloelectron-volts (KeV), as shown by the dotted lines. At energies greater than this range, the SNR is reduced because carbon and oxygen reflect approximately equally, and, thus, the signal is relatively low. At energies lower than this range, the SNR is reduced because the low reflectance results in low detected X-ray flux and, thus, relatively high image noise.

X-ray tubes produce polyenergetic X-ray beams wherein the highest energy X-rays are determined by the X-ray tube potential and the lowest energy X-rays are determined by the beam filtration material. The average X-ray energy produced from an X-ray tube operating at a specific potential and beam filtration can be found from, for example, the aforementioned "Catalogue of Spectral Data for Diagnostic X-rays". Data from this source are shown in FIG. 9 comprising a plot of the average X-ray energy produced by an X-ray tube as a function of X-ray tube potential.

Figure 9:
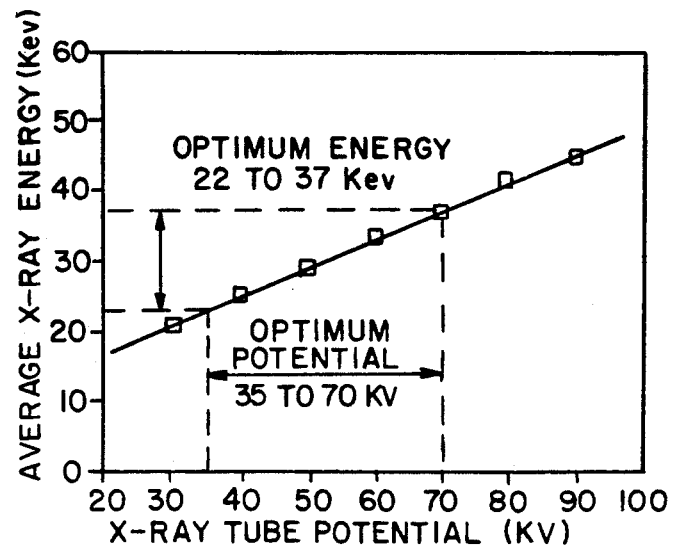
FIG. 9 is a graph of X-ray tube potential versus average X-ray energy.

Data in FIG. 9 are for a beam filtration of 1 millimeter aluminum for potentials less than 60 Kilovolts (KV) and 1.5 millimeter aluminum otherwise. As can be seen from FIG. 9, operation of the X-ray tube with a potential of 35 to 70 KV produces an average X-ray energy of 22 to 37 KeV, the previously discussed optimum. Operation within this optimum potential range results in the highest SNR, and therefore the lowest subject radiation exposure, fastest image acquisition time, lowest X-ray tube power requirements, and best image quality.

The optimum dose of 1 to 10 microRem is determined as the range that satisfies each of the conflicting requirements of image quality and health risk. (As previously discussed, higher radiation doses pose a non-trivial health risk to persons being exposed. Radiation doses lower than this range are unnecessarily conservative for health protection and provide unacceptably poor image quality.) Based on this optimum subject radiation dose, the optimum X-ray flux and size of the scanning X-ray beam can be derived. As can be seen in FIG. 7, the difference in X-ray reflectance between carbon (Z=6) and oxygen (Z=8) is about 30 percent at the optimum X-ray energy of 30 Kev. It has been empirically determined that in order to detect explosives and other dangerous objects, the acquired image must be able to resolve reflectance differences of a few percent. As discussed later, it has been empirically determined that the CV must be in the range of 2 to 10 percent. This, in turn, requires approximately 11,500 X-rays to strike each pixel on the subject being examined, as shown by the following analysis. It has been empirically determined that the preferred embodiment detector area of 952 square inches placed 8 inches from the subject will receive a backscatter of approximately 7% of these 11,500 X-rays, i.e., approximately 800 X-rays per pixel. The preferred embodiment detective quantum efficiency of 50% will result in about 400 of the 800 X-rays contributing to the detector output signal. As the previously presented equation (2) shows, 400 X-rays detected in each pixel will result in a coefficient of variation of 5 percent, within the required range for acceptable image quality and detection capability.

Published reports, for example the previously referenced "Catalog of Spectral Data...", give the conversion between X-ray flux and dose for a 50 KV spectrum as: 1 microRem=95 X-rays per square millimeter. The previously derived optimum dose value of 1 to 10 microRem would therefore produce 1 to 10 times 95, or 95 to 950 X-rays per square millimeter. Further dividing the optimum X-ray flux of 11,500 X-rays per pixel by the optimum dose of 95 to 950 X-rays per square millimeter provides the optimum pixel size of 12 to 120 square millimeters measured where the X-ray beam strikes the person being examined.

For a square, or nearly square beam cross-section, this defines the optimum beam width as the square root of 12 to 120 square millimeters, or approximately 3.5 to 11 millimeters, in both the vertical and horizontal dimension. As is standard notation in the art of X-ray imaging, the above dimensions are measured at the point at which the beam intensity is reduced to one-half of its maximum intensity, and refer to the average dimension of the beam over the scan cycle.

Further restrictions are placed on the size of the X-ray beam by acceptable image acquisition time and X-ray tube current, as the following calculation shows. The total number of X-rays detected during a scan is given by:

$$N_i = \frac{N_p A_i}{d^2} \quad (5)$$

where $N_i$ is the total number of X-rays detected during a scan, $N_p$ is the average number of X-rays detected in each pixel, $A_i$ is the area of the entire scan, and d is the linear dimension of the square pixels, i.e., the X-ray beam size.

The rate at which these X-rays are detected in the image in given by:

$$R = Fd^2 \quad (6)$$

where R is the rate at which X-rays are detected in the image (in X-rays per milliamp-second), and F is the X-ray flux (in X-rays per square millimeter per milliamp-second). The current-time required to detect $N_i$ X-rays at R rate is then given by dividing equation (5) by equation (6):

$$It = \frac{N_p A_i}{Fd^4} \quad (7)$$

where I is the X-ray tube current and t is the total scan time.

Solving for d in the above equation:

$$d = \left(\frac{N_p A_i}{FIt}\right)^{\frac{1}{4}} \quad (8)$$

An important fact to note from the above equation is that while the parameters in the denominator may change dramatically with varying embodiments of the system, the size of the X-ray pencil beam, d, is much more constant and limited in range. In particular, the beam size varies as only the one-fourth power of any of the parameters. For example, state-of-the-art stationary target X-ray tubes can operate with a sustained maximum current, I, of 2 to 10 milliamps, a range of 5 to 1. A total scan time, t, of 1 to 5 seconds is acceptable for most security applications, which is also a range of 5 to 1. Multiplying these ranges shows that within the principles of the invention, the X-ray tube current and scan time can together vary by as much as a factor of 25. In spite of this wide variation, the dimension of the pencil X-ray beam, d, will vary by only twenty-five to the one-fourth power, or about 2.25. This shows that throughout the range of variation of the present invention, the beam size is relatively fixed. It has been empirically determined that for the above range of X-ray tube current and scan time, the X-ray beam size is optimized in the range of 4 to 9 millimeter in both the vertical and horizontal dimensions.

The preferred embodiment of the system includes an X-ray tube operating at a potential of approximately 50 KV and 5 milliamps. The vertical and horizontal dimension of the X-ray beam is approximately six millimeters (6 mm) where it strikes the person being examined. The detector system 17, discussed below, has a scan acquisition time of approximately 2 seconds. The empirically measured subject dose with these parameters is approximately three microRem.

Looking at the detector 17, scintillators vary widely in term of chemical composition, thickness and energy response. The above determination of the optimum energy spectrum allows the identification of the most convenient scintillator that shows acceptable performance in the system. The preferred scintillator must detect a large fraction of the incident radiation, produce significant light output to the photomultiplier tube, and exhibit a temporal decay time which is short compared to the pixel to pixel scanning rate of the pencil beam. It has been empirically determined that these parameters are satisfied by a scintillator screen commonly used in medical radiography composed of Calcium Tungstate (CaWO$_4$) with an exemplary approximate areal density of 80 milligrams per square centimeter. One version of this screen is marketed under the trade name Cronex Lightning Plus by the Dupont Corporation.

The relatively fast decay time of 10 microseconds allows rapid scanning of the pencil beam with little image degradation. Approximately 70% of the incident radiation is detected by this screen which in turn produces approximately 250 usable light photons for each 30 KeV X-ray. Thicker screens detect more of the incident radiation at the expense of lower light output. An alternative screen contains approximately 40 milligrams per square centimeter of Lanthanum oxybromide: thulium activated (LaOBr:Tm) and is marketed under the trade name of Cronex Quanta III by Dupont Corporation.

When used with the optimum 50 KV X-ray spectrum, these screens show a detector quantum efficiency in the range of 50 to 70 percent. In addition, these scintillators produce a level of light output that is detectable by photomultiplier tubes, and have short temporal decay times. If the optimum X-ray energy were higher, these screens would provide unacceptably poor detective quantum efficiency (DQE) because they are of insufficient areal density to absorb higher energy X-rays. If the optimum X-ray energy were lower, the DQE would also drop because low energy X-rays generate too few light photons to overcome the optical attenuation of the scintillator. This results in insufficient light reaching the photomultiplier and the reduced DQE. Increasing the areal density of these screens up to 140 milligrams per square centimeter slightly increases the DQE because more of the incident X-rays will be absorbed. Increasing the areal density beyond 140 milligrams per square centimeter is not useful because the light generated in the inner portions of the screen cannot escape the screen to reach the photomultiplier tube. Screen areal densities less than 40 milligrams per square centimeter are not useful in that they cannot absorb a significant portion of the incident X-rays, resulting in an unacceptably low DQE.

Empirical measurements on the present invention show the preferred operating parameters are capable of simultaneously providing a CV of 5% and a subject radiation dose of 3 microRem. In these measurements, the apparatus of the present invention was operated in accordance with the above-described preferred technique factors. The image CV provided by the apparatus was measured by acquiring images of persons and determining the CV by calculating the pixel mean and standard deviation. The determined CV of many images is then averaged to provide the empirically measured CV of 5%. Subject radiation dose provided by the apparatus was measured by positioning thermoluminescent dosimeter (TLD) chips at the subject position in the imaging window and operating the apparatus for 400 scan cycles. Radiation dose readings from the TLD chips are then divided by 400 resulting in the empirically measured subject dose of 3 microRem.

Most significantly, the present invention allows the use of hundreds of times less subject radiation dose than required by prior art systems to provide equivalent image quality. As will now be explained, several significant factors contribute to the low radiation dose provided by the present invention:

(1) Detection of scatter X-rays

Prior art systems are designed and optimized to operate by detecting X-rays that have been transmitted through the body. Even at high X-ray tube potentials, a very low percentage of X-rays can penetrate through the body. Data on X-ray penetration can be readily found in the literature, for example the previously referenced "Catalogue of Spectral Data . . . ". Data from this reference shows that at 140 KV only about 1.4 percent of incident X-rays penetrate through an average person's body thickness of 20 centimeters and are detectable to form an image. Only about 0.19 percent of incident X-rays penetrate through a large person's body thickness of 30 centimeters, and are detectable to form an image. In marked improvement over the prior art, the present invention enables seven percent (7%) of the X-rays to be detected. The greatly increased X-ray flux utilization of the present invention backscatter geometry can therefore be seen to provide a reduction of a factor of five to thirty-five in the required radiation dose compared to prior art X-ray transmission type systems, for equal numbers of detected X-rays.

(2) Optimization of X-ray energy

The X-ray potential in prior art systems is selected to optimize the image quality for transmission radiography. This requires high energy X-rays to achieve sufficient penetration through the body, and thus achieve a larger number of detected X-rays. For example the system disclosed in U.S. Pat. Re. No. 28,544 operates with a peak voltage of 150 Kilovolts. From the above referenced "Catalog of Spectral Data . . . ", (extrapolating from FIG. 9) this potential produces X-rays with an average energy of approximately sixty (60) Kiloelectron-volts (Kev). Importantly, the preferred embodiment of the present invention operates with an empirically and theoretically determined optimum X-ray tube potential of 50 Kilovolts, resulting in X-rays of approximately thirty (30) KeV.

Standard references can be used to obtain the values for the X-ray interaction with matter at these energies, for example, "Radiation Detection" by Tait, published by The Butterworth Group, London, 1979. The attenuation coefficients of carbon and oxygen can be used to show characteristics of the two energies. At 60 KeV, the attenuation coefficients of carbon and oxygen, are 0.1765 and 0.1945 grams per centimeter squared, respectively, or a difference of about ten percent. At 30 Kev, the attenuation coefficients are 0.2520 and 0.3733, respectively, a difference of forty-eight percent (48%). This difference in X-ray attenuation results in a backscatter image contrast at 30 Kev being approximately a factor of five (5) greater than at 60 Kev. It is known that the dose required to produce an image is inversely proportional to the square of the contrast, for example, see "Basic Concepts of Digital Subtraction Angiography" by Kruger and Riederer, published by Hall Medical Publishers, Boston, pg 79. Thus, the X-ray energy selection of the present invention provides higher contrast images allowing the use of approximately a factor of twenty-five (25) times lower radiation dose than prior art systems.

(3) Large pixel size

Prior art systems use much smaller image pixels than the present invention. For example, in the system disclosed in U.S. Pat. No. Re. 28,544, the pixel size is 1 millimeter square. In the system disclosed in U.S. Pat. No. 3,884,816 the pixel size is selectable between 0.1 millimeters square and 2 millimeters square. For a constant CV, a fixed average number of X-rays must be detected in each pixel regardless of the pixel size. The radiation dose is then proportional to the fixed number of X-rays striking each pixel divided by the area of the pixel. This, in turn, results in the radiation dose being inversely proportional to the pixel area. The preferred embodiment of the present invention uses pixels of area 40 square millimeters, resulting in a factor of 40 reduction in dose compared to 1 square millimeter pixels, a factor of 400 reduction compared to 0.1 millimeter square pixels, and a factor of 10 compared to 2 millimeter square pixels.

(4) Detector collection area

The X-ray detector in the preferred embodiment of the present system consists of an area sensitive to X-rays of 952 square inches positioned 8 inches from the person being searched.

In the stationary detector configuration, the actual detector area is 1904 square inches positioned at the same distance from the subject, however, not all detectors 17' will be receiving backscattered radiation during a scan. The effective detection area at any given point in the scan is approximately the same as for the scanning detector, i.e., one-half the total detector area of the stationary detector configuration. Empirical measurements show that this size and positioning result in the detector receiving approximately seven percent (7%) of incident X-rays as backscatter. As indicated above, this is approximately a factor of five to thirty-five times greater than for transmission imaging. Prior art systems do not disclose backscatter geometries with sufficient detector collection area to achieve the required low radiation dose. For example, in U.S. Pat. No. Re. 28,544 the detector consists of an active area 1 inch by 24 inches, or a total X-ray collection area of 24 square inches. This is a factor of approximately 40 lower than the 952 square inches of X-ray sensitive area provided in the present invention. The increased collection area of the present invention is absolutely necessary to provide detection of an increased number of scattered X-rays allowing for a 40 fold reduction in dose compared with the backscatter system of the prior art. It has been determined by empirical measurement that the detector must consist of an active area in the range of 150 to 1500 square inches and placed in the range of 5 to 15 inches from the person being searched so that at least 2% of the scattered radiation is detected.

In operation of the system, the subject is first scanned with the imaging system 10 to obtain a digitally represented image. This image is then processed by the digital computer 24 to identify key features in the image. In the preferred embodiment, in order to preserve the subject's privacy, certain anatomical features may be suppressed or screened out to avoid the display of these features to the system operator. The key features in the newly acquired image are then compared with a stored library containing previously obtained human images. This library of human images is used to identify common anatomical features in the present subject so those anatomical features can be suppressed. The library may also contain within its images certain common benign objects which can also be suppressed to permit more accurate detection of dangerous or illegal concealed objects. These common anatomical and benign features are not of concern to the system operator and are suppressed in the processed image signal. The remaining features in the image are regarded as unusual and potentially indicative of objects that the system operator is attempting to detect.

The location of detected features can be referenced to the absolute location in the image, or in relation to the body of the person being examined. The latter method has the advantage of being insensitive to subject positioning within the imaging window and differing subject size.

The library of image features can consist of threshold or coefficient values that have been derived from previously acquired images. For example, in a particular imaging system, it may be desirable to identify the location of the left side of the subject by convolving the image with a left edge detection kernel. The left edge of the subject's body can then be found as the first pixel from the left side of the convolved image that exceeds a threshold value. Various threshold values and kernel coefficients values can be tested using the previously acquired images. The most effective values are identified and stored in the memory of the computer 24.

The suppression of anatomical and benign image features can consist of selectively displaying the features at reduced intensity, in a different color, or removing them entirely from the image. In one embodiment, the outline of the subject's body is removed from the image and a humanoid outline is substituted for location reference. In another embodiment, if very few or no abnormal features are detected, the display may consist of alpha-numeric information, such as: "No abnormal features detected" or "Diagonal edge detected on upper chest". Threshold levels can be changed according to the level of sensitivity required and the tolerable level of false positives.

FIG. 1 shows a block diagram of the imaging system 10 which produces an image signal 20 that is modulated by characteristics of the body 12 of the person being examined. The image signal is routed into a digital computer system 24 such as an IBM PC that is capable of implementing preprogrammed instructions for image analysis. The computer system comprises a memory in which is stored the library of previous image signals of persons not concealing dangerous objects. The computer system 24 uses this information to generate a processed image on monitor 36 in which image features that correspond to common benign objects and normal human anatomy are suppressed. The operator viewable image that may be inspected for evidence of dangerous concealed objects.

The scanning movement of the X-ray source may introduce some amplitude distortion in the displayed image where the torso is brighter than the extremities. In an alternate embodiment, to compensate for this distortion, a corrected signal can be generated by generating an approximation of the distortion. A pixel by pixel comparison of the acquired image is made to a selected threshold which is taken to be the background. Each pixel in the distortion image equals the average of the non-background pixels surrounding the corresponding pixel in the acquired image, thereby creating a 2-dimensional low pass filter. The corrected image is the result of dividing a pixel in the acquired image by the corresponding pixel in the distortion image.

The task of isolating an object from the associated background is a common problem in the art of image processing. It is well known that detection of an object edge is often more reliable than detection of the entire object based on a shifted signal level alone. Edge enhancement is a common method of processing digitally represented images to increase the detectability or objects. The present invention uses extensive edge detection in visual processing. In order to enable edge enhancement for detection, radiation scattered off at different angles is detected by using a large size X-ray detector, and a unique placement of the detector assembly to provide spatially uniform edge enhancement of concealed objects having low atomic number. The system also provides concurrent suppression of the image edges of the internal anatomy of the person being examined. These edge modifications provide a significantly more informative image for the detection of concealed objects.

Figure 3A:
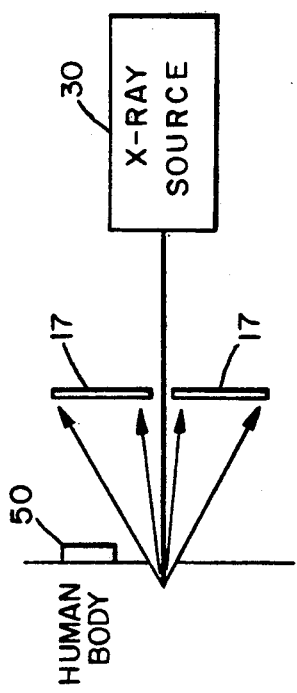
FIG. 3 is a block diagram illustrating a series of scanning steps.
Figure 3B:
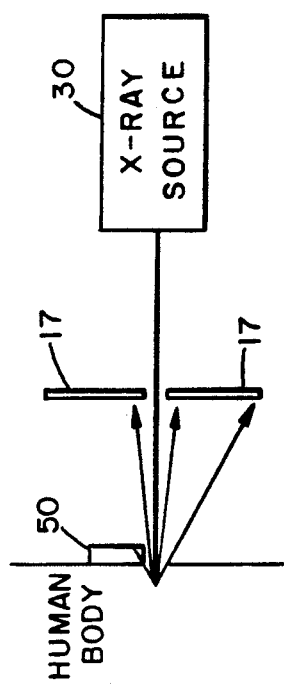
Figure 3C:
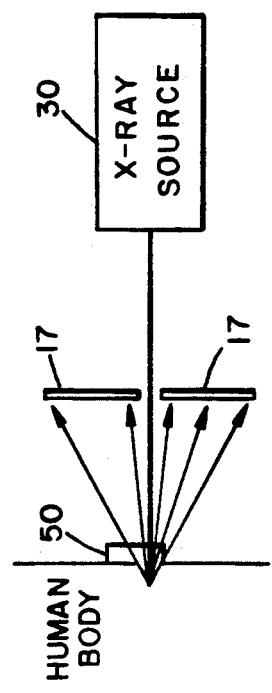

As shown in FIGS. 3a, 3b, and 3c, an X-ray source 30 is used to generate a narrow pencil beam 11 of X-rays directed toward the object being examined. In this example, the object is a one-half ($\frac{1}{2}$) inch thick bar 50 of plastic in front of the subject's chest. The plastic bar 50 is used to simulate, for example, a plastic explosive. Initially, the X-ray beam strikes only the person's body as shown in FIG. 3a. Many of the X-rays penetrate a few centimeters into the body, interact by Compton scattering, and exit the body through the same surface that they entered. X-ray sensitive detectors 17 are placed symmetrically around the incident X-ray pencil beam to detect the scattered X-rays and provide an electronic signal characteristic of the X-ray reflectance. The pencil beam 11 of X-rays is scanned over the surface of the plastic bar 11 (and all other objects), as shown in FIGS. 3b and 3c, to provide a profile of the X-ray reflectance.

FIG. 4a shows the results of an actual signal generated by the operation of the configuration in FIG. 3. In FIG. 4a, the signal level from the array of detectors 17 is plotted as a function of pixel number, as the pencil beam in scanned across the body and plastic. Several features can be noted in the plot. The plastic contains a large amount of carbon ($Z=6$). The body contains a large amount oxygen ($Z=8$). This difference in atomic number accounts for the signal level increasing markedly when the X-ray beam strikes the plastic (region b) compared to when it strikes the body (regions a and c). The indicated CV of 2% is sufficient for the system, permitting the operator to conclude that region b has distinct characteristics from regions a and c.

The transition region between the body and the plastic shows a principle feature of the invention. The edge has been enhanced by lowering the signal level in the body near the interface. FIG. 3b shows how the signal level is lowered. If the pencil beam enters the body near the interface, a significant portion of the scattered X-rays 16 must pass through the plastic 50 to reach the detector 17, and are, thus, attenuated. This additional X-ray attenuation reduces the number of detected X-rays, reducing the signal level. The level increases when the pencil beam strikes the plastic near the interface. In this case, much of the X-ray scattering takes place in the plastic. This increases the detected scatter because X-rays can exit the side of the plastic bar with correspondingly less attenuation. Together these two processes result in sharp, well defined edges in the image signal.

FIG. 4d shows the same graph as in FIG. 4a, however, the relative image noise has been increased to a CV of 10%. As is readily apparent, the increased relative image noise interferes with detection of the concealed plastic bar and only a minimal distinction appears between signal areas a, b, and c. It will be appreciated from FIG. 4b that the indicated CV of 10% is barely sufficient to detect the plastic bar.

FIG. 4c shows the same graph as in FIGS. 4a and 4b with the relative image noise increased to a CV of 20%. In FIG. 4c there is no discernible distinction between signal areas a, b, and c, and a system operator would clearly be unable to detect the plastic bar based on the image. It can thus be appreciated from a comparison of FIGS. 4a-c that a CV of less than 10%, as utilized in FIG. 4b, is required to detect concealed objects of composition and thickness similar to the indicated sample test object.

FIG. 4b shows the X-ray scatter profile wherein a 1" thick plastic bar in immersed in water simulating an organ contained within the body of person being examined. The signal level is again higher in the plastic; however, the edges are much less distinct than in the case of FIG. 4a. This edge suppression is a result of removing the conditions that enhanced the edges in the previous case, as well as a second mechanism described below.

The second mechanism can be explained by examining the X-ray path. The X-rays initially follow the path of the pencil beam into the object. After scattering, the X-rays exit the object along paths directed toward the detector. Depending on the detector size and location, this may encompass passing through material several centimeters from the pencil beam. The detected X-ray scatter will thus be determined by the atomic number of the material around the pencil beam, rather than in the pencil beam alone. This spacial averaging smooths the edges of embedded objects as shown in FIG. 4d.

The edges of concealed objects and internal anatomy are likely to appear equally at all angles. Uniform enhancement of the edges at these various angles requires the detector to be approximately uniformly responsive to X-rays scattered at equal angles with respect to the pencil beam. This is accomplished by positioning the area detectors 17 approximately symmetrically around the incident X-ray beam 11. The output of the detectors can then be summed at the computer 24 to produce a single output signal.

In order for automatic edge detection to be effective, the scattered X-ray detector must be of a certain size and placement. X-rays at 30 Kev typically scatter within about one inch after entering the body 12 of the subject. While an X-ray is equally likely to be scattered in all directions, only those X-rays that are scattered toward the active area of the detectors 17 contribute to the acquired image. As explained above, and shown in FIG. 3b, a portion of the backscattered X-rays exiting the body encounter the lower edge of the plastic bar 50 because they exit the body offset from the incident pencil beam at a certain angle, thus providing edge enhancement. At too small an angle, attenuation by the edge of plastic bar 50 will be minimal and will not provide edge enhancement. Therefore, the detectors 17 must be of sufficient size and placement to collect a substantial portion of the backscattered X-rays which exit the body 12 greater than a certain angle from the point at which the X-ray beam entered the body. For the particular parameters encountered with human bodies and the sizes of concealed objects desired to be detected, the offset distance is at least a few tenths of an inch, for X-rays scattered at angles on the order of 10° or more. This requires the vertical and horizontal dimensions of the detector to be greater than or equal to approximately one fifth of the distance between the human body and the detector (tan 10° = 0.18). Detectors smaller than this value will not exhibit significant edge modification because the scatter angle is too small (less than 10°). In the preferred embodiment, the subject is positioned eight inches from the detector of 34 inches by 34 inches, collecting X-rays scattered up to approximately 70° from the incident pencil beam. In practical applications the detector must be spaced greater than 5 inches from the subject to allow room for scanning the subject with the pencil X-ray beam. In addition to providing excellent edge modification, this detector size collects a large percentage of the scattered X-rays. This reduces the radiation dose given the subject, as well as reducing the output required of the X-ray source.

Prior art systems have not provided for spatially uniform edge enhancement resulting from the present invention's detector size and placement. For example, U.S. Pat. No. Re. 28,544 discloses using a 1 inch by 24 inch active area as a backscatter detector. If this detector were placed horizontally 8 inches from the human body being scanned, edge enhancement would occur only for vertical edges in the image. The vertical height of the detector, i.e., 1 inch at an 8-inch distance, is insufficient to enhance horizontal image edges. Similarly, if the detector were mounted vertically, vertical image edges would not be enhanced. The present invention provides for edge enhancement of low Z objects in both the vertical and horizontal direction by providing a detector of sufficient size in both the vertical and horizontal direction.

The digital computer 24 and memory of the invention provide feature storage and recognition. The library of image features is formed by first acquiring a large number of digitally represented images of humans with no dangerous concealed objects which are then stored in a library of images. Each of these scans is then processed, as is known in the art, to extract the key features of the image. Feature extraction in performed on each image using various feature extraction kernels.

Several sample feature extraction kernels are shown in FIG. 10. When convolved with an image being evaluated, kernels a, b, and c of FIG. 10 produce images with enhanced vertical, horizontal, and diagonal edges, respectively. Kernels d, e, and f are capable of enhancing rod shaped objects with vertical, horizontal, and diagonal orientation respectively. Each pixel of each enhanced image is then compared with a threshold value to detect the occurrence of these image features. The location, type, and intensity of each feature is then stored in the digital memory of the computer 24.

The system provides for varying kernel size, and provides threshold levels that vary as a function of image parameters. In order to enhance the efficiency of accessing the stored feature library, the system includes provisions for selectively sorting the data according to feature location, feature type and statistical frequency of occurrence in several images.

As can be appreciated from the above, prior art systems provide unacceptable images at comparable radiation dose levels compared to the present invention. Alternatively it may be expressed that these prior art systems require much larger amounts of radiation exposure to produce similar quality images as the present invention.

It has been found that a low level of relative image noise is required to provide an operable system for detecting concealed objects under persons' clothing. It has further been found that a radiation dose in the range of 1 to 10 microRem is acceptable for the routine examination of persons entering security areas. No known operable prior art system uses these low levels of radiation for detecting concealed objects.

Detailed measurement conducted on the inventive system shows that the present invention is capable of producing images with a CV of five percent while exposing the person being examined to a radiation dose of three microRem. No known prior art system is capable of simultaneously providing both of these operational parameters. For example, the following analysis shows the limitations of an X-ray transmission system, such as disclosed in the prior art. From the above referenced "Catalog of Spectral Data . . . " for an X-ray tube operating at 140 Kilovolts, a three microRem dose corresponds to an X-ray flux of 250 X-rays per square millimeter striking the skin of the person. As referenced herein above, human bodies in the range of 20 to 30 centimeters thickness will transmit only 0.19 to 1.4 percent of these X-rays. For example, using the average of these two values, or 0.8 percent, results in an average of only two X-rays being detected per millimeter square pixel and a corresponding CV of about 70 percent Alternatively, if the incident exposure of this system is adjusted to provide 400 transmitted X-rays to obtain the corresponding CV of five percent, the dose will be increased by a factor of 400/2.0 or more than 600 microRem.

A backscatter system such as mentioned in the prior art can likewise be shown to be incapable of simultaneously providing a CV of five percent and a dose of three microRem. As referenced above, the dose of three microRem corresponds to an X-ray flux of 250 X-rays per square millimeter striking the body of the person being examined. Also as referenced above, approximately seven percent (7%) of these X-rays are detected in the present invention as backscatter. As stated above, the prior art discloses an X-ray sensitive area approximately forty times smaller than the present invention and therefore the detected X-ray fraction of such smaller detector area will be approximately 7%/40 or 0.175 percent. This results in an average of only 0.44 X-rays per pixel (250 X-rays×0.175%), and a corresponding CV of 150 percent. Alternatively, if the incident exposure of this system is adjusted to provide 400 backscattered X-rays to obtain the corresponding CV of five percent, the dose will be increased by a factor of 400/0.44 or more than 1000 microRem.

As can be seen from the above analysis, known prior art systems are incapable of providing an image CV of four percent with a subject dose of three microRem. If these prior art systems operate to achieve a dose of three microRem, the associated CV is in the range of 15 to 30 times the level of the present invention. Conversely, if the prior art systems are operated to produce the required CV of five percent, the corresponding dose produced is more than 200 times the present invention. The reduced contrast of the prior art backscatter systems previously discussed further increases this dose by a factor of twenty-five.

While the invention has been particularly shown and described with reference to a preferred embodiment thereof, it will be understood by those skilled in the art that various changes in form and details may be made therein without departing from the spirit and scope of the invention.

I claim:

1. X-ray imaging apparatus for detecting a low atomic number object carried by or on a human body positioned at a distance from said apparatus comprising:
   x-ray source for producing a pencil beam of X-rays directed toward said human body;
   scanning means for moving the region of intersection of said pencil beam and said human body over the surface of said human body in a scanning cycle, said scanning cycle being sufficiently short to expose said human body to a low radiation dose;
   a detector assembly providing a signal representative of the intensity of the X-rays scattered from said human body as a result of being scanned by said scanning means, said detector assembly being disposed on a same side of said human body as said X-ray source and having an active area with dimensions sufficient to receive a substantial portion of said scattered X-rays to provide a coefficient of variation of less than 10 percent in said signal; and
   display means to presenting characteristics of the detector signal to an operator;
   wherein said scattered X-rays are distributed across said detector to create an edge effect which enhances edges of said low atomic number object to enable detection.

2. X-ray imaging apparatus as in claim 1 wherein said display means includes means for suppressing anatomical features of said human body.

3. X-ray imaging apparatus of claim 1 wherein at least a portion of said detector assembly is horizontally adjacent said X-ray source.

4. The X-ray imaging apparatus of claim 1 wherein said detector assembly is positioned substantially symmetrically around the pencil beam of X-rays.

5. X-ray imaging apparatus as in claim 1 wherein said detector assembly comprises at least one each of:
   a light tight enclosure; 'an X-ray conversion means having an active area for converting the scattered X-rays into light in an interior of said light tight enclosure;
   photodetecting means having an active area responsive to said light positioned in the interior of the enclosure wherein the active area of said X-ray conversion means is larger than the active area of said photodetecting means.

6. X-ray imaging apparatus as in claim 5 wherein said photodetecting means comprises a photomultiplier tube.

7. X-ray imaging apparatus of claim 5 wherein said active area of said X-ray conversion means has vertical and horizontal dimensions each greater than one-fifth of said distance between said human body and said apparatus.

8. X-ray imaging apparatus as in claim 5 wherein said light tight enclosure has a generally triangular configuration in side view.

9. X-ray imaging apparatus as in claim 5 wherein said X-ray conversion means comprises a fluorescent chemical screen.

10. X-ray imaging apparatus as in claim 9 wherein said fluorescent chemical screen comprises calcium tungstate and has an areal density in the range of 40 to 140 milligrams per square centimeter.

11. X-ray imaging apparatus as in claim 9 wherein said fluorescent chemical screen comprising lanthanum oxybromide:thulium activated and has an areal density in the range of 40 to 140 milligrams per square centimeter.

12. Radiant energy imaging apparatus for detecting objects carried on a person's body comprising:
   radiant energy imaging means providing an image signal representative of said person's body and objects carried on said person's body by detecting radiant energy modulated by the body;
   memory means for storing a library of reference image features derived from previously imaged human bodies;
   computational means for comparing features of said image signal to anatomical features of said reference image features to identify anatomical features of said image signal; and
   display means for presenting a display signal representative of said image signal wherein its anatomical features have been suppressed.

13. Radiant energy imaging apparatus as in claim 12 wherein said library of reference image features further contains information for comparison to said image signal to permit suppression of benign objects in said display signal.

14. Radiant energy imaging apparatus as in claim 12 wherein the radiant energy comprises X-rays that have been scattered by said person's body being examined.

15. Radiant energy imaging apparatus as in claim 12 wherein said display signal includes a generic humanoid outline, and the suppression consists of removing the similar features from said display signal, said generic humanoid outline providing a reference for locating objects on said person's body.

16. Apparatus for searching a subject comprising primarily a first low Z material for concealed objects of a second low Z material, comprising:
- a source of X-rays;
- collimation means for forming a beam of X-rays from said X-ray source, wherein said beam intersects said subject at a region of intersection corresponding to a pixel having a pixel value;
- scanning means for moving said region of intersection over the surface of said subject in a scanning cycle so that a plurality of pixels is defined, said scanning cycle being sufficiently short that said subject is exposed to a radiation dose of less than 10 microRem;
- a detector adjacent said scanning means for detecting a substantial portion of X-rays backscattered from said subject and providing an image signal comprising a plurality of pixel values representative of X-rays backscattered from said subject as a result of being scanned by said beam wherein said plurality of pixel values has a coefficient of variation resulting from X-ray statistical noise of less than 10 percent; and
- display means for visually presenting said image signal.

17. An apparatus for searching a subject as in claim 16 wherein at least 2 percent of X-rays in said beam are detected by said detector.

18. An apparatus for searching a subject as in claim 16 wherein said radiation dose is less than five microRem.

19. An apparatus for searching a subject as in claim 16 wherein X-rays in said beam have an energy in the range of 22 to 37 KeV.

20. Apparatus for searching a person as in claim 16, wherein said source of X-rays comprises an X-ray tube operating at a potential in the approximate range of 35 to 70 Kilovolts.

21. An apparatus for searching a subject as in claim 16, wherein said region of intersection has a diameter in the range of 3.5 to 11 millimeters.

22. An apparatus for searching a person as in claim 16, wherein each pixel comprises an area in the range of 12 to 120 square millimeters.

23. An apparatus for searching a subject as in claim 16, wherein said detector means comprises an effective X-ray sensitive area greater than 150 square inches and is positioned a distance of less than 15 inches from the body of said subject.

24. An apparatus for searching a subject as in claim 16 wherein said display means comprises a computer and a monitor.

25. An apparatus for searching a subject as in claim 24 wherein said computer has a memory in which is stored a library of reference images for comparison to said image signal.

26. An apparatus for searching a subject as in claim 25 wherein said computer uses comparison of said image signal to said library of reference images to suppress certain features within said image signal prior to display on said monitor.

27. In an X-ray backscatter imaging system for searching for a first low Z material on a background having second low Z, said first low Z being lower than said second low Z, a method comprising the steps of:
- positioning said background body in an imaging area;
- operating an X-ray tube to produce X-rays having a low dose directed toward said imaging area;
- collimating said X-rays into a pencil beam of a cross-section measured where said pencil beam intersects said imaging area, said cross-section corresponding to one of a plurality of pixels each pixel having a pixel value;
- scanning said pencil beam of X-rays over said image area at a sufficiently high rate to impart less than 10 microRem of radiation dose to said background body;
- detecting X-rays that are backscattered from said pencil beam as a result of interacting with matter positioned in said image area; and
- displaying a digitally represented image comprising said plurality of pixels wherein each pixel of said plurality is representative of the detected backscattered X-rays produced by matter located at its corresponding cross-section and a coefficient of variation of all pixel values of said plurality of pixels resulting from X-ray statistical noise of less than 10 percent.

28. A method for searching a background body for concealed objects as in claim 27 wherein the step of displaying further comprises comparing said digitally represented image to a library of reference images.

29. A method of searching as in claim 28 wherein the step of displaying further comprises suppressing certain features of said digitally represented image which are common with reference images in said library.

30. A method for searching as in claim 27, wherein the step of collimating produces said cross-section in the range of 12 to 120 square millimeters.

31. A method for searching as in claim 27 wherein the step of operating an X-ray tube comprises producing X-rays having energies in the range of 22 to 37 KeV.

32. A method for searching as in claim 27, wherein the step of operating an X-ray tube comprises setting the X-ray tube potential in the range of 35 to 70 Kilovolts.

33. A method for searching as in claim 27, wherein the step of detecting X-rays comprises positioning an effective X-ray sensitive area greater than 150 square inches positioned a distance less than 15 inches from said subject.

34. A method for searching as in claim 27 further comprising adjusting the time period of said scan cycle and adjusting the area of said cross-sectional area to provide a radiation dose less than 5 microRem.

35. A method for searching as in claim 34 wherein said radiation dose is approximately 3 microRem and said coefficient of variation is approximately 5 percent.

36. In an X-ray backscatter imaging system for searching a person for concealed plastic explosive, a method comprising the steps of:
- positioning said person in an imaging area;
- operating an X-ray tube to produce X-rays directed toward said imaging area;
- collimating said X-rays into a pencil beam of cross-section measured where said pencil beam intersects said imaging area;
- scanning said pencil beam over said image area at a sufficiently high rate to impart less than 10 microRem of radiation dose to said person;
- detecting a sufficient quantity of X-rays that are backscattered from said pencil beam as a result of interacting with matter positioned in said image area so that modulation of the backscattered X-rays resulting from the presence of said plastic explosive is distinguishable from statistical noise of the detected X-rays; and displaying an image representative of the modulation resulting from the presence of said plastic explosive in said imaging area.

37. A method for searching a subject for concealed plastic explosive as in claim 36 wherein the step of displaying comprises comparing the modulation of the detected X-rays to a library of image features.

38. A method of searching a subject for concealed plastic explosive as in claim 37 wherein the step of displaying further comprises suppressing a portion of the modulation of the detected X-rays which is in common with said library of image features.

39. A method for searching as in claim 36 wherein said plastic explosive has an effective atomic number in the range of 6 to 8.

40. A method for searching as in claim 36 wherein said radiation dose is less than 5 microRem.

41. A method for searching as in claim 36 wherein the modulation of the backscattered X-rays resulting from the presence of said plastic explosive in said imaging area is surrounded by modulation resulting from the presence of the body of said subject in said imaging area.

42. A method for searching as in claim 36 wherein said plastic explosive has a thickness of less than one-half inch.

* * * * *

US005181234B1

REEXAMINATION CERTIFICATE (3966th)

United States Patent [19]
Smith

[11] B1 5,181,234
[45] Certificate Issued Jan. 4, 2000

[54] X-RAY BACKSCATTER DETECTION SYSTEM

[75] Inventor: Steven W. Smith, Poway, Calif.

[73] Assignee: Rapiscan Security Products/Inc. (U.S.A.), Long Beach, Calif.

Reexamination Request:
No. 90/005,281, Mar. 8, 1999

Reexamination Certificate for:
Patent No.: 5,181,234
Issued: Jan. 19, 1993
Appl. No.: 07/704,292
Filed: May 22, 1991

Related U.S. Application Data

[63] Continuation-in-part of application No. 07/563,041, Aug. 6, 1990, abandoned.
[51] Int. Cl.[7] .............................. G01N 23/04; G06K 9/46
[52] U.S. Cl. ................... 378/87; 378/57; 378/62; 378/901; 250/472.1; 382/100; 382/266
[58] Field of Search ............................ 378/57, 901, 62, 378/87, 86, 88, 70, 146; 250/472.1; 382/100, 266

[56] References Cited

U.S. PATENT DOCUMENTS 4,598,415  7/1986  Luccio et al. ........................... 378/119

OTHER PUBLICATIONS

American Science & Engineering, Jul. 29, 1987, letter to Evelyn Wright, DOT–FAA, PJB–87–L–019.
"An X–Ray Inspection System for Detection of Explosives on Personnel", DOT–FAA, Technical Center, Atlantic City, New Jersey, vol. I of II, ASE–5249–I.
Stein et al., "Flying Spot X–Ray Imaging Systems", Jul. 1972, American Science & Engineering, Inc., pp. 137–148.
Towe et al., "X–Ray Compton Scatter Imaging Using a High Speed Flying Spot X–Ray Tube", Oct. 1981, IEEE Transactions on Biomedical Engineering, vol. BME–28, No. 10, pp. 717–721.

*Primary Examiner*—David P Porta

[57] ABSTRACT

A pencil beam of X-rays is scanned over the surface of the body of a person being examined. X-rays that are scattered or reflected from the subject's body are detected by a detector. The signal produced by this scattered X-ray detector in then used to modulate an image display device to produce an image of the subject and any concealed objects carried by the subject. The detector assembly is constructed in a configuration to automatically and uniformly enhance the image edges of low atomic number (low Z) concealed objects to facilitate their detection. A storage means is provided by which previously acquired images can be compared with the present image for analyzing variances in similarities with the present image, and provides means for creating a generic representation of the body being examined while suppressing anatomical features of the subject to minimize invasion of the subject's privacy.

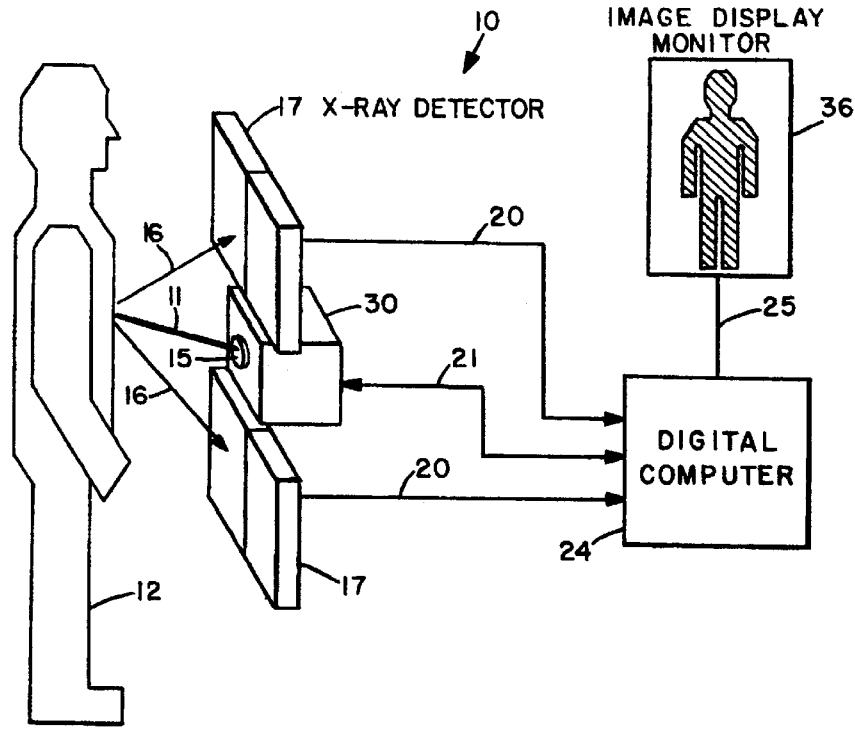

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–42 is confirmed.

* * * * *